United States Patent
Strowitzki

(10) Patent No.: US 6,782,029 B1
(45) Date of Patent: Aug. 24, 2004

(54) DEDUSTING UNIT FOR A LASER OPTICAL ELEMENT OF A GAS LASER AND METHOD FOR ASSEMBLING

(75) Inventor: Claus Strowitzki, Gilching (DE)

(73) Assignee: TuiLaser AG, Germering (DE)

( * ) Notice: Subject to any disclaimer, the term of this patent is extended or adjusted under 35 U.S.C. 154(b) by 0 days.

(21) Appl. No.: 09/510,667

(22) Filed: Feb. 22, 2000

(51) Int. Cl.$^7$ ............................................. H01S 3/03

(52) U.S. Cl. ..................... 372/61; 372/51; 372/55; 372/59; 372/81; 372/82; 372/87

(58) Field of Search ............................. 372/51, 55, 59, 372/61, 81, 82, 87, 57

(56) References Cited

U.S. PATENT DOCUMENTS

| | | | |
|---|---|---|---|
| 3,400,596 A | 9/1968 | Laich | 74/89.23 |
| 3,753,144 A | 8/1973 | Kearns et al. | 372/35 |
| 3,877,794 A | 4/1975 | Kulle et al. | 350/187 |

(List continued on next page.)

FOREIGN PATENT DOCUMENTS

| | | | | |
|---|---|---|---|---|
| DE | 31 30 399 A1 | 2/1983 | | |
| DE | 32 12928 C2 | 10/1983 | | |
| DE | 37 10 525 C2 | 10/1987 | | |
| DE | 3718467 A | 12/1988 | ........... | H01S/3/086 |
| DE | 297 15 466 U1 | 10/1997 | | |
| DE | 198 40 035 A1 | 4/1999 | | |
| EP | 0456875 A | 11/1991 | ........... | H01S/3/086 |
| EP | 1128498 A2 * | 8/2001 | | |
| FR | 2698496 A | 5/1999 | | |
| JP | 2250383 | 10/1990 | ........... | H01S/3/086 |
| JP | 05067823 | 3/1993 | | |
| JP | 5152643 A | 6/1993 | ........... | H01S/3/034 |
| JP | 06237034 | 8/1994 | | |
| WO | WO9960674 A | 11/1999 | | |

OTHER PUBLICATIONS

Kodeda, et al., "Adjustable Mounting Unit for an Optical Element of a Gas Laser," US application 09/511,648 filed Feb. 22, 2000 (Status: pending).

Kodeda, et al., "An Optical Element Holding and Extraction Device," US application 09/510,666 filed Feb. 22, 2000 (Status: pending).

Strowtizki, et al. "Gas Laser Discharge Unit," US application 09/510,539 filed Feb. 22, 2000 (Status: pending).

Kodeda, et al.., "A Gas Laser and a Dedusting Unit Thereof," US application 09/511,649 filed Feb. 22, 2000 (Status: pending).

Strowitzki, et al., "Shadow Device for a Gas Laser," US application 09/510,017 filed Feb. 22, 2000 (Status: pending).

Strowitzki et al., "Modular Gas Laser Discharge Unit," US application 09/510,538 filed Feb. 22, 2000 (Status: pending).

*Primary Examiner*—Paul Ip
*Assistant Examiner*—Delma R. Flores-Ruiz
(74) *Attorney, Agent, or Firm*—Mintz, Levin, Cohn, Ferris, Glovsky and Popeo, P.C.

(57) ABSTRACT

A dedusting unit for a laser optical element is provided. The dedusting unit comprises a high-voltage duct comprising a high-voltage conducting core having a first end and a second end and an insulator element disposed around the core. The first end of the core is connectable to a high voltage power supply and the second end of the core is electrically connected to a wire loop. The dedusting unit may be used in connection with a variety of gas lasers. In use, the dedusting unit is mounted to the laser tube so that the wire loop is disposed inside the gas laser tube in proximity to an optical element to be protected from dust. The dedusting unit is further mounted so that the wire loop is transverse to the resonating path of the laser light within the laser tube so that the resonating laser light may pass through the wire loop without being obstructed by the wire loop. A method for installing the dedusting unit to protect a laser optical element in a gas laser is also provided.

20 Claims, 4 Drawing Sheets

U.S. PATENT DOCUMENTS

| | | | |
|---|---|---|---|
| 3,886,474 A | 5/1975 | Hensolt et al. | 372/107 |
| 4,423,510 A | 12/1983 | Pack et al. | 372/56 |
| 4,448,385 A | 5/1984 | Matthys | 248/476 |
| 4,534,034 A | 8/1985 | Hohla et al. | 372/59 |
| 4,541,848 A * | 9/1985 | Masuda | 361/235 |
| 4,638,486 A | 1/1987 | Dost et al. | 372/107 |
| 4,686,685 A | 8/1987 | Hoag | 372/107 |
| 4,744,091 A | 5/1988 | Gorisch et al. | 372/107 |
| 4,746,201 A | 5/1988 | Gould | 350/394 |
| 4,769,824 A | 9/1988 | Seki | 372/107 |
| 4,891,818 A | 1/1990 | Levatter | 372/57 |
| 5,268,923 A | 12/1993 | Welsch et al. | 372/107 |
| 5,319,663 A | 6/1994 | Reid et al. | 372/59 |
| 5,373,523 A | 12/1994 | Fujimoto et al. | 372/103 |
| 5,377,215 A * | 12/1994 | Das et al. | 372/57 |
| 5,438,587 A | 8/1995 | Kinley | 372/86 |
| 5,473,162 A * | 12/1995 | Busch et al. | 250/339.08 |
| 5,585,641 A | 12/1996 | Sze et al. | 250/492.1 |
| 5,591,317 A * | 1/1997 | Pitts, Jr. | 204/667 |
| 5,729,564 A | 3/1998 | Cullumber | 372/58 |
| 5,748,663 A | 5/1998 | Chenausky | 372/55 |
| 5,771,258 A | 6/1998 | Morton et al. | 372/57 |
| 5,857,775 A | 1/1999 | Vodzak et al. | 374/121 |
| 6,018,537 A | 1/2000 | Hofmann et al. | 372/102 |
| 6,151,346 A | 11/2000 | Partlo et al. | 372/38.02 |
| 6,192,061 B1 | 2/2001 | Hart et al. | 372/107 |
| 6,208,674 B1 | 3/2001 | Webb et al. | 372/55 |
| 6,359,922 B1 | 3/2002 | Partlo et al. | 372/57 |
| 6,363,094 B1 | 3/2002 | Morton et al. | 372/58 |

* cited by examiner

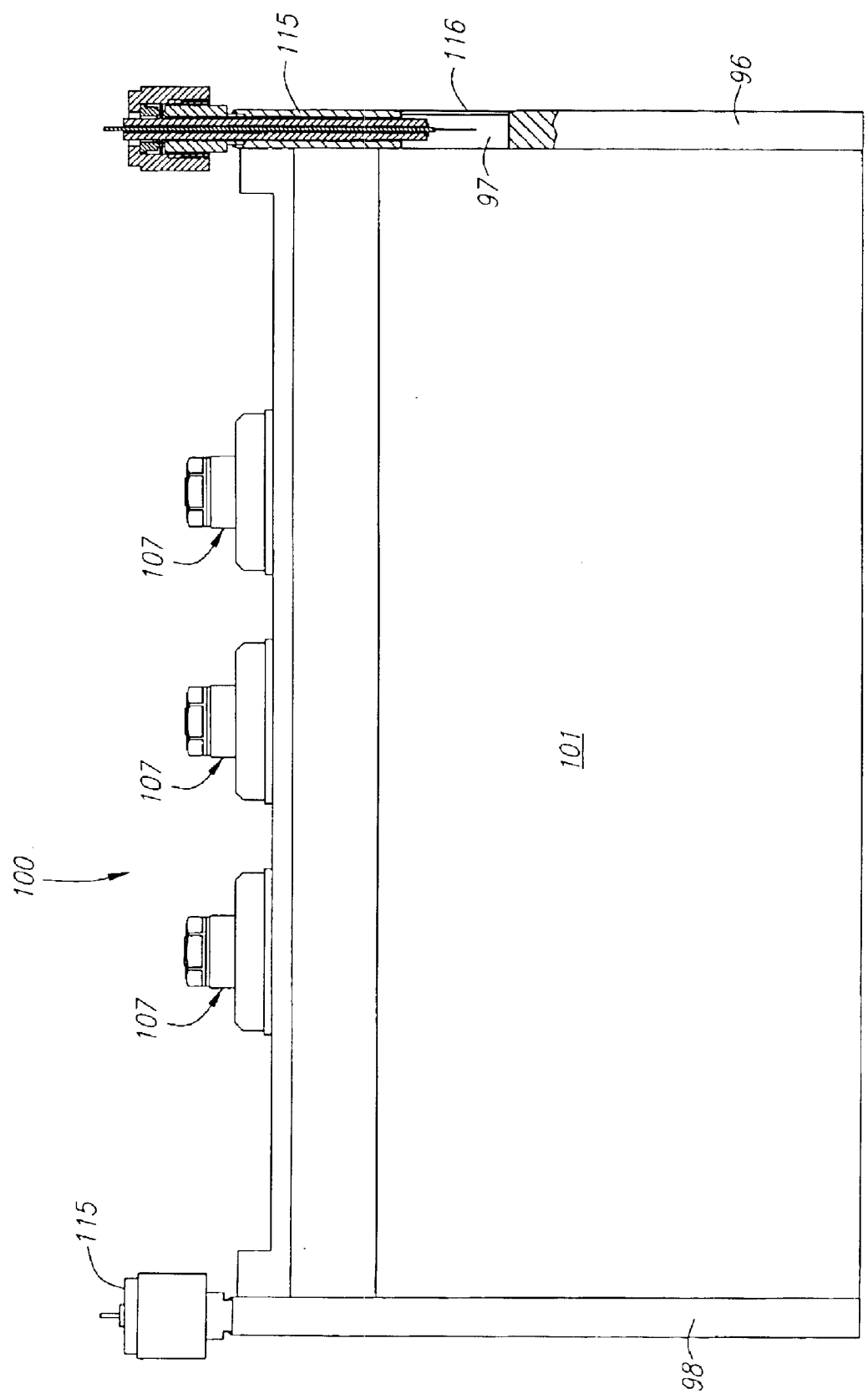

DEDUSTING UNIT FOR A LASER OPTICAL ELEMENT OF A GAS LASER AND METHOD FOR ASSEMBLING

BACKGROUND OF THE INVENTION

The present invention relates to gas lasers. The present invention also relates to dedusting units for the laser optical elements of gas lasers and to methods for assembling dedusting units for laser optical elements in gas lasers.

Lasers have recently been applied to a large variety of technical areas, such as optical measurement techniques, material processing, medicine, etc.

Thus, there is a big demand on providing near diffraction limited lasers, i.e. lasers generating laser beams having a short wavelength.

The excimer laser, such as the one disclosed in U.S. Pat. No. 5,771,258, serves well as a laser for generating coherent light.

The excimer laser described in U.S. Pat. No. 5,771,258 is a pulsed laser. Pulsing a is required in excimer lasers to allow sufficient time between pulses to replace the laser gas within the discharge region with fresh gas and allow the gas used for generating the previous pulse to recover before being used again for another gas discharge. In the discharge region (i.e., discharge gap), which in an excimer laser is typically defined between an elongated high voltage electrode and an elongated ground electrode which are spaced apart from each other, a pulsed high voltage occurs, thereby initializing emissions of photons which form the laser beam.

The laser beam is emitted along the extended ground electrode in a longitudinal direction of the laser tube. The laser beam leaves the tube through a window of the tube.

Unfortunately dust within the laser tube deteriorates the optical performance of the optical elements within the tube, for example the windows and/or mirrors in the tube that define the laser resonator.

There have been made several efforts to solve this problem.

For example, Japanese Patent No. 6 237 034 discloses a discharge excited gas laser device with negative electrodes having holes, through which the laser beam can pass. The negative electrodes are mounted to the optical window sections in the laser tube. Negative voltage is applied to the electrodes by a negative power supply to thereby charge the surface of the optical windows, which would normally be brought into contact with dust in the laser tube, with a negative charge. As a result, negatively charged dust particles in the tube are prevented from adhering to the optical windows.

Furthermore, Japanese Patent No. 5 067 823 discloses a discharge excitation pulse gas laser apparatus with a static gas chamber provided near an optical window at the end section of the laser tube. The static gas chamber includes a space that is designed to ensure no gas flow occurs within the chamber due to the gas circulation in the rest of the laser, thus making it hard for the metallic dust particles to reach the surface of the window even if the gas is agitated by a gas circulation means, such as a fan, in the laser tube.

German Patent Application DE 198 400 35 discloses an excimer laser with a pair of electrodes in the region of the windows. A high voltage is applied to the electrodes to control a plasma gas flow through the output window. The electrodes located in the region of the windows thus generate a directed gas flow. Further, a series of slots in the electrodes are electrostatically charged to attract dust particles. In the laser tube, a main electrode arrangement is provided for creating a gas discharge. In addition, a gas cleaning unit is provided.

The laser tubes according to the state of the art as mentioned above use a technology, in which the optical system itself or the limiter of the reduced flow area is charged. This leads to a large surface to be charged and thus, high-energy losses occur with only low field gradients of the electrical field being generated. The charged elements push off precharged metallic dust particles. Another disadvantage of the devices described above is their rather complex construction, which makes them expensive and susceptible to malfunctions.

RELATED APPLICATIONS

The present invention may be used in conjunction with the inventions described in the patent applications identified below and which are being filed simultaneously with the present application:

| Docket No. | Title | Inventors | Filing Date | Serial or Patent No. |
|---|---|---|---|---|
| 249/300 | Gas Laser Discharge Unit | Claus Strowitzki and Hans Kodeda | Feb. 22, 2000 | 09/510,539 |
| 249/301 | A Gas Laser and a Dedusting Unit Thereof | Hans Kodeda, Helmut Frowein, Claus Strowitzki, and Alexander Hohla | Feb. 22, 2000 | 09/511,649 |
| 249/303 | Shadow Device for A Gas Laser | Claus Strowitzki and Hans Kodeda | Feb. 22, 2000 | 09/510,017 |
| 249/304 | Modular Gas Laser Discharge Unit | Claus Strowitzki and Hans Kodeda | Feb. 22, 2000 | 09/510,538 |
| 250/001 | Adjustable Mounting Unit for an Optical Element of a Gas Laser | Hans Kodeda, Helmut Frowein, Claus Strowitzki, and Alexander Hohla | Feb. 22, 2000 | 09/511,648 |
| 250/002 | An Optical Element Holding and Extraction Device | Hans Kodeda and Helmut Frowein | Feb. 22, 2000 | 09/510,666 |

All of the foregoing applications are incorporated by reference as if fully set forth herein.

SUMMARY OF THE INVENTION

A first object of the invention is to provide a dedusting unit for a laser optical element with improved properties, especially with reference to the complexity of construction.

To achieve the first object, a dedusting unit for a laser optical element is provided, which comprises a high-voltage duct comprising a high-voltage conducting core having a first end and a second end and an insulator element disposed around the core, the first end of the core being connectable to a high voltage power supply, and a wire loop electrically connected to the second end of the high-voltage core.

The optical element to be protected by the dedusting unit may be any of the optical elements used in a gas laser. As a result, the optical element to be protected may be a fully reflective mirror, a partially transparent, partially reflective mirror, or a fully transparent window.

Thus, the present invention provides a very simple device for preventing dust from reaching an optical element of the laser tube, especially the output window, through which the laser light is emitted, or the 100% reflecting mirror providing resonant laser light. Because the construction is very simple and small, the dedusting unit according to the invention may be readily mounted in front of the mirrors and windows in the tube.

Furthermore, the dedusting unit according to the invention may easily be detached from its mounting. A further advantage of the device is that an electrical field with very high field gradients is generated by the wire loop when the dedusting unit is connected to a high voltage power supply, thereby significantly improving the dedusting effect compared with the devices according to the state of the art.

The wire loop may have any loop form. Preferably, however, the wire loop has a substantially circular form having a diameter that is sufficient to allow the resonating laser light within the tube to pass through the wire loop without being obstructed.

A second object of the invention is to provide a gas laser comprising a laser optical element with an improved dedusting unit, especially with reference to the complexity of the construction of the dedusting unit.

To achieve the second object of the invention, a gas laser is provided comprising a tube having a first end wall at one end and a second end wall at the other end and defining a cavity for containing a laser gas. An elongated high voltage electrode is disposed within the tube and extends parallel to the longitudinal axis of the tube. An elongated ground electrode is also disposed within the tube. The ground electrode extends parallel to the high voltage electrode and is spaced apart from the high voltage electrode to thereby define a gas discharge gap therebetween. A laser resonating path is also provided in axial alignment with the gas discharge gap. A first laser optical element is disposed in the laser resonating path and has a side exposed to the cavity formed by the tube. And a dedusting unit is mounted to the laser tube. The dedusting unit comprises (1) a high-voltage duct comprising a high-voltage conducting core having a first end and a second end and an insulator element disposed around the core, the first end of the core being connectable to a high voltage power supply, and (2) a wire loop electrically connected to the second end of the high-voltage core. The dedusting unit is mounted to the laser tube so that the wire loop is disposed inside the tube in proximity to the first side of the optical element, and the wire loop is transverse to the resonating path so that the resonating path passes through the wire loop.

The gas laser comprising the dedusting unit according to the present invention has improved properties with reference to maintenance and lifetime, because the optical elements, such as a window or a mirror within the tube, dirty significantly less compared with those according to the state of the art.

A third object of the invention is to provide a simple method for assembling a dedusting unit for a laser optical element in a gas laser.

To achieve this third object, a method for installing a dedusting unit for a laser optical element of a gas laser is provided, wherein the gas laser comprises a tube having a first end wall at one end and a second end wall at the other end and defining a cavity for containing a laser gas, a laser resonating path substantially parallel to the longitudinal axis of the tube and along which coherent light can resonate, and a laser optical element having a first side exposed to the cavity formed by the tube, the laser optical element being mounted to the first end wall so that the first side of the optical element is disposed in the laser resonating path, and wherein the dedusting unit for the optical element comprises (1) a high-voltage duct comprising a high-voltage conducting core having a first end and a second end and an insulator element disposed around the core, the first end of the core being connectable to a high voltage power supply, and (2) a wire loop electrically connected to the second end of the high-voltage core. A preferred method according to this third object of the invention comprises the steps of (1) flattening the wire loop into an elongated shape so that the width of the wire loop is smaller than the diameter of a bore hole extending through the first end wall, (2) inserting the wire loop through the bore until the elongated wire loop is inside the tube, (3) expanding the elongated wire loop to a desired form which is transverse to the resonating path, and (4) positioning the wire loop of desired form so that it is in proximity to the first side of the optical element and the laser resonating path passes through the wire loop.

Thus, a very simple and thus cheap method is provided for installing a dedusting unit for a laser optical element in a gas laser according to the present invention.

In accordance with a preferred embodiment of the present invention, the high-voltage duct is a waveguide like coaxial duct.

According to a further embodiment of the invention, the insulator element of the high-voltage duct comprises a cylindrical ceramic tube and the core is coaxial disposed within the ceramic tube. With this embodiment, an effective and cheap construction of the high voltage duct is provided.

The dedusting unit for the laser optical element may be installed through a bore hole that extends radially through one of the end walls of the laser in proximity to the optical element to be protected. Alternatively, the dedusting unit may extend through a bore hole that extends transverse through the end wall on which the optical element to be protected is mounted.

The dedusting unit of the present invention can be used in connection with a variety of gas lasers. It is particularly well suited to be used in connection with excimer lasers.

Preferred embodiments of the invention will now be described in detail in connection with the accompanying drawings.

BRIEF DESCRIPTION OF THE DRAWINGS

FIG. 3 is a partial cut-away side view of another gas laser in which a dedusting unit for a laser optical element according to the invention is employed;

DETAILED DESCRIPTION OF THE PREFERRED EMBODIMENTS OF THE INVENTION

Figure 1:
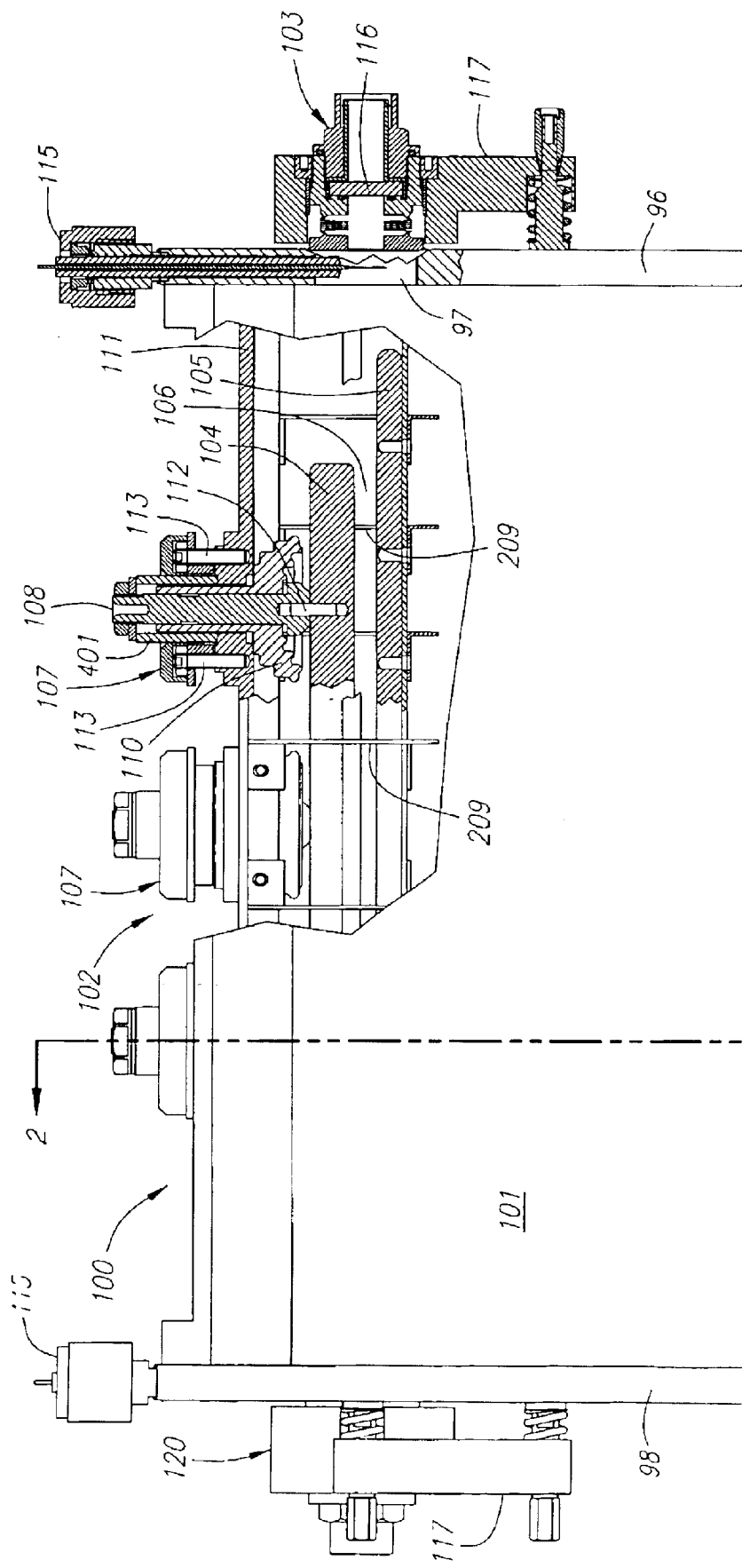
FIG. 1 is a partial cut-away side view of a gas laser in which the dedusting unit for a laser optical element according to a preferred embodiment of the invention is employed.
Figure 2:
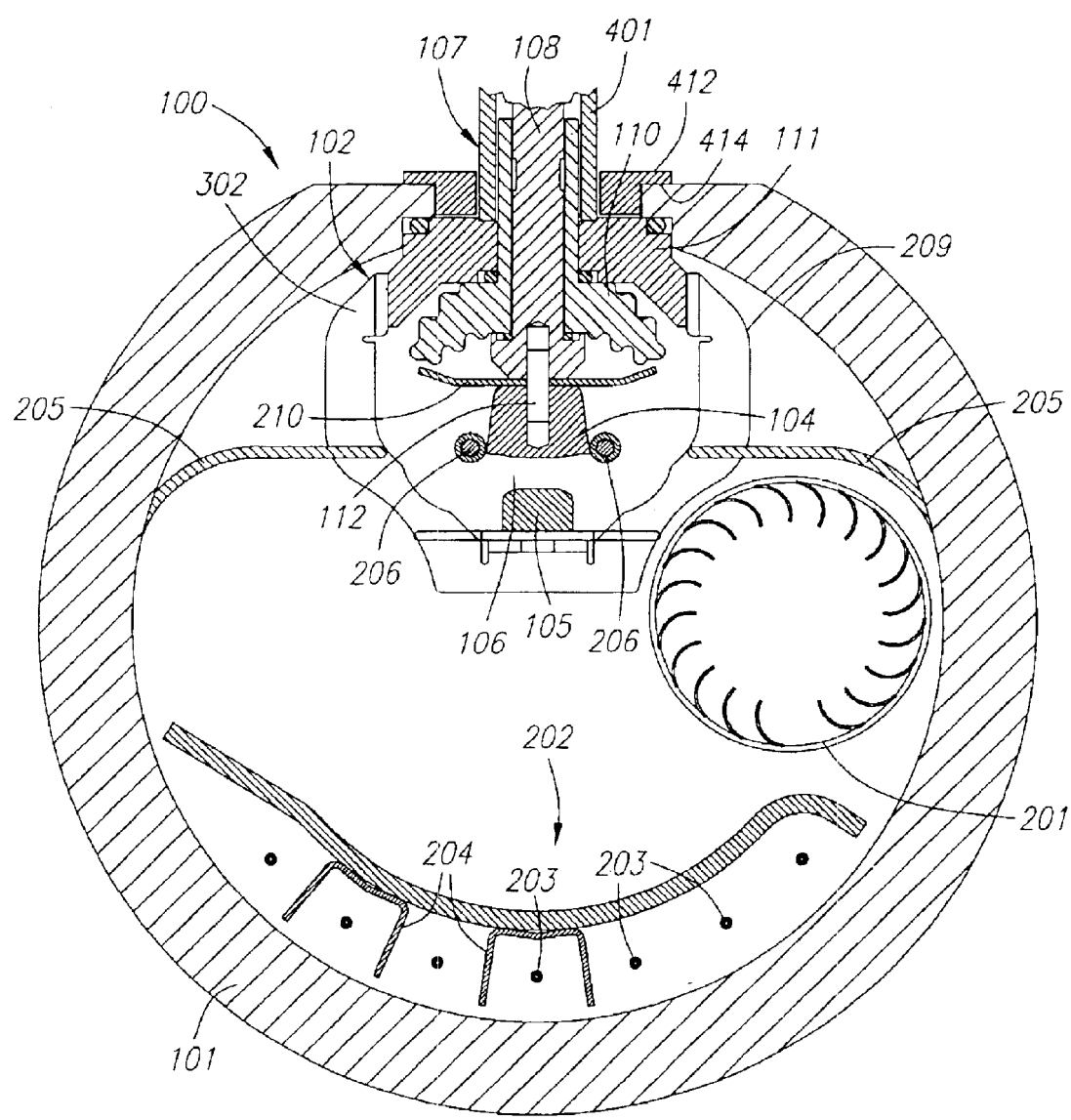
FIG. 2 is a cross-sectional view of the gas laser in FIG. 1 along Line 2—2.

A gas laser 100 in which the dedusting unit 115 of the present invention may be used is illustrated in FIGS. 1 and 2. FIGS. 1 and 2 show a gas laser 100, preferably an excimer laser, comprising a tube 101, a discharge unit 102, a circulation means 201, and a laser optical system 103 and 120.

Laser tube 101 includes a first end wall 96 at one end and a second end wall 98 at the other end. Laser tube 101 defines a laser cavity for containing the desired laser gas. As is known in the art, gas laser 100 may also comprise means for cooling the laser gas, such as a gas cooler, within laser tube 101.

The circulation means 201 is optional and may comprise, for example, a fan or any other means known for circulating lasing gases in gas lasers.

The discharge unit 102 is mounted into the tube 101 and comprises a high voltage electrode 104 and the ground electrode 105. The high voltage electrode 104 and the ground electrode 105 are spaced apart from each other, thereby defining a gas discharge gap 106. A high voltage is applied to the high voltage electrode 104 via a plurality of high voltage ducts 107, which carry the high voltage electrode 104. Each high voltage duct 107 comprises a conductive core 108 and an insulator element 110 arranged around the conductive core 108. In addition, each high-voltage duct 107 includes a cylindrical shield 401, which is disposed around a portion of the insulator element 110. Each high voltage duct 107 is attached to the high voltage electrode 104. The high voltage ducts may be attached to the high voltage electrode using any suitable fastener. In the present embodiment, a double threaded stud 112 is used to attach electrode 104 to each conductive core 108 of each duct 107.

Furthermore, discharge unit 102 is provided with an elongated electrode plate 111. The electrode plate 111 includes holes, through which the high voltage ducts 107 extend so as to be connected to the high voltage electrode 104. Each high voltage duct 107 is fixed to the electrode plate 111 by an attachment means, such as bolts 113. Those skilled in the art will appreciate, however, that any suitable attachment means may be used to fix ducts 107 to electrode plate 111.

The insulator elements 110 are preferably made of a ceramic material. Optionally, however, they may be made from other insulative materials, including, for example, a fluoride material. They preferably have a shape that conically expands towards the high voltage electrode 104 and comprise a corrugated surface, so as to increase a creepage path extending along said surface. This helps to prevent surface flashover between the high voltage electrode 104 and the grounded electrode plate 111.

As illustrated in FIG. 2, discharge unit 102 also preferably comprises a shadow plate 210 disposed between the gas discharge gap 106 and the insulator element 110 for protecting the insulator element 110 against the corrosive effect of the laser gas and of the laser radiation. Shadow plate 210 is preferably made out of a metal, such as aluminum.

The excimer laser 100 may be, for example, a pulsed fluorine gas ($F_2$) excimer laser with a wavelength of about 157 nanometers. This means that fluorine gas is used for generating the laser beam. However, as those skilled in the art will appreciate, any of the known excimer laser gases may be used in connection with the present invention, as well as any of the other lasing gases for gas lasers.

By applying a high voltage pulse on the order of 20 kV to the high voltage electrode 104, the laser gas (e.g., fluorine gas) and additionally helium and/or argon gas as a buffer gas in the discharge gap 106 generate a laser beam which is emitted through the laser optical system comprising a front optical system 103 and a rear optical system 120. As those skilled in the art will appreciate, the laser resonating path for the laser 100 is in axial alignment with the gas discharge gap 106.

Laser 100 typically further comprises a front optical element 116, through which the laser beam emits. Optical element 116 is disposed in the laser resonating path and has one side exposed to the laser cavity formed by tube 101. Optical element 116 in front optical system 103 emits the laser beam, it may, therefore, comprise a partially reflective mirror or a fully transmissive window.

Optical element 116 may be provided, for example, in an optical system 103 that includes an adjustable mounting means 117 for adjusting the position of the optical element 116 in relation to the tube 101. Rear laser optical system 120 similarly includes an optical element 116 (not shown) disposed in the laser resonating path and adjusting means 117. However, the optical element 116 of the rear laser optical system 120 would preferably comprise a totally reflective mirror rather than a partially reflective mirror or a fully transmissive window. If both optical elements 116 are fully transmissive than the mirrors forming the resonator may be mounted on adjustable mounting brackets that are separate from the laser tube 101 as is known in the art. As those skilled in the art will appreciate, front and rear optical elements 116 may also be mounted directly in the end walls of the laser tube 101 as shown in FIG. 3.

A suitable laser optical system and adjustable mounting means for use in connection with the present invention as front and rear optical systems 103, 120 are described in concurrently filed applications bearing attorney docket nos. 250/001 and 250/002, which are hereby incorporated by reference. The filing details of these applications are provided above.

Regardless of whether front optical element 116 is mounted directly in end wall 96, or a mounting structure, such as optical system 103, attached to the end wall 96, a port 97 is provided in the end wall 96 which is aligned with the resonating path. In addition, the optical element 116 is also aligned with the port 97 so that laser light resonating in the laser can impinge upon the optical element 116.

Preferably a similar structure to that employed at end wall 96 is also employed at the end wall 98. However, laser 100 may also be designed so that the rear optical element 116 is mounted in alignment with the resonating path fully within laser tube 101, for example, on the inner wall of the rear end wall 98.

FIG. 2 is a cross-sectional view along line 2—2 of the excimer laser 100 shown in FIG. 1. As can be seen in FIG. 2, the excimer laser 100 preferably further includes a circulating means 112, such as a fan, for circulating the excimer laser gas through the discharge gap 106 and an optional dedusting unit 202 for dedusting the gas flow through the tube 101. The dedusting unit comprises high voltage wires 203, separated from each other by U-shaped channels 204 extending along the tube 101. Furthermore, two guiding plates 205, which are elongated in the longitudinal direction of the tube 101 are preferably provided for guiding the gas flow through discharge gap 106 and a portion of such gas into dedusting unit 202. After exiting dedtisting unit 202, the gas returns to fan 201 to be recirculated through the laser 101. A detailed description of a suitable dedusting unit 202 for use in connection with the present invention is provided in a concurrently filed application bearing attorney docket no. 249/301, which is hereby incorporated by reference. The filing details of this application are provided above.

The ground electrode 105 is preferably carried by, or mounted to, the electrode plate 111 via a plurality of flow guides 209. Flow guides 209 are preferably conductive so that they electrically couple the ground electrode 105 to the electrode plate 111, which in turn electrically couples the ground electrode to the laser tube 101, which is held at ground potential.

Adjacent to the high voltage electrode 104, two pre-ionizers 206 are provided, which serve to pre-ionize the laser gas to ensure greater homogeneity of the gas discharge in the discharge gap 106.

The pre-ionizers 206 are preferably corona-type pre-ionizers and extend substantially parallel to said high voltage electrode. The pre-ionizers 206 have a coaxial shape with a conductive core 207 surrounded by a tube shaped insulator 208.

The corona-type pre-ionizers can be mounted immediately adjacent to the high voltage electrode. In particular, as shown in FIG. 2, the corona-type pre-ionizers should be mounted at the opposing edges of the high voltage electrode so that it is disposed adjacent the electrode face of the high voltage electrode facing the ground electrode.

Although corona-type pre-ionizers are preferred for use as pre-ionizers 206 in connection with the present invention, those skilled in the art will recognize that any of the pre-ionizers known in the art may be used. Furthermore, the insulator of the pre-ionizers is preferably a ceramic material such as alumina. It can also be a fluoride material. Alternatively, any other kind of known pre-ionizer can be used. The pre-ionizers are not necessary for the discharge unit to work. Indeed, excimer lasers were known before the invention of pre-ionizers. Pre-ionization, however makes the gas discharge between the high voltage electrode and the ground electrode more homogeneous and thus more reliable.

Discharge unit 102 is more fully described in a concurrently filed application bearing attorney docket no. 249/300, and is hereby incorporated by reference as if fully set forth herein. The filing details of this application are provided above:

Although high voltage electrode 104 and ground electrode 105 are preferably mounted on an electrode plate to form a modular discharge unit 102 as described above. The present invention is not limited to use in gas lasers with modular discharge units. As those skilled in the art will appreciate, a variety of techniques have been used for mounting an elongated high voltage electrode and an elongated ground electrode in a parallel, spaced-apart relationship in a gas laser tube so as to define a gas discharge gap therebetween and the laser resonating path. Those skilled in the art will appreciate that these other techniques may also be satisfactorily employed in connection with the present invention.

As illustrated in FIGS. 1 and 3, laser 100 preferably comprises dedusting units 115 for the optical elements 116 in the front end wall 96 and rear end wall 98. Although it is preferred to use a dedusting unit 115 for each optical element 116, the present invention also contemplates the use of only one dedusting unit 115 for one of the optical elements 116. If only one dedusting unit 115 is to be employed, preferably it is used in connection with the optical element 116 that is designed to emit the laser light from the laser. In the embodiments illustrated in FIGS. 1 and 3, this would correspond to the optical elements 116 mounted on the front end wall 96.

Figure 4:
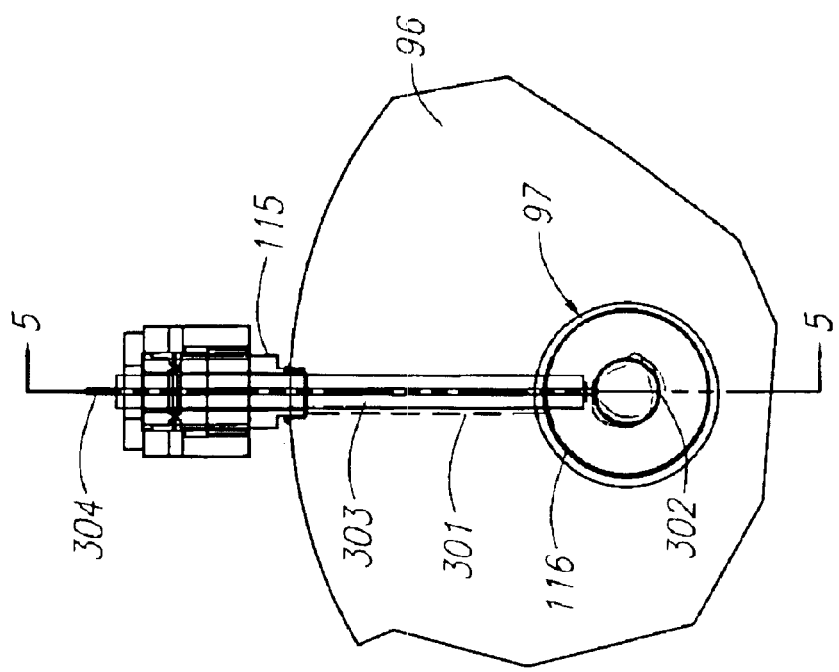
FIG. 4 is a front view of a dedusting unit for a laser optical element according to a preferred embodiment of the invention, the dedusting unit being interposed between the gas discharge gap and an optical element mounted to an end wall of a laser tube.

As can be seen from FIG. 4, the dedusting unit 115 is placed in front of the window 116 of the tube 101. This is true regardless of whether optical element 116 is mounted in an adjustable mounting means 103, 120, as shown in FIG. 1, or directly in an end wall 96, 98, as shown in FIG. 3.

Figure 5:
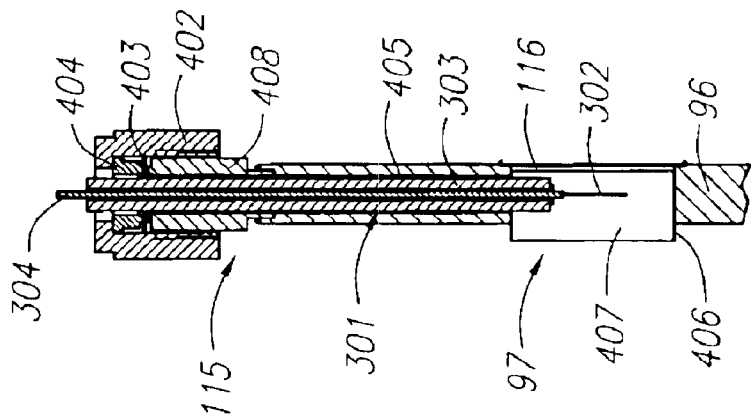
FIG. 5 is a cross-sectional view along Line 5—5 of the dedusting unit shown in FIG. 4.

Referring to FIGS. 4 and 5, the dedusting unit 115 comprises a high-voltage duct 301 and a wire loop 302 is a circular closed loop as illustrated in FIG. 4. High-voltage duct 310 comprises a high-voltage conducting core 304 and an insulator element 303 disposed around the core. One end of the high-voltage core is connectable to high-voltage power supply (not shown) and a second end is electrically connected to the wire loop 302. Preferably, insulator element 303 is made out of a ceramic material.

The dedusting unit 115 is preferably installed in laser unit 100 by flattening the wire loop 302 into an elongated loop so that the width of the wire loop is smaller than the diameter of a bore hole 405 in tube end wall 96, and preferably the outer diameter of the high-voltage duct 301. The dedusting unit 115 is then inserted, wire loop end first through the bore 405 until the elongated wire loop is inside the tube and at least a portion of the high-voltage duct 301 is within the bore 405. The wire loop is then expanded to a desired form which is transverse to the resonating path and positioned so that it is in proximity to the inner facing surface of the optical element 116 and the laser resonating path passes through the wire loop. Preferably, the diameter of the expanded loop is sufficient to allow the resonating laser light within the tube to pass through the wire loop 302 without being obstructed.

As will be appreciated by those skilled in the art, the flattening step may be omitted if the wire loop is initially formed so that it is elongated and with diameter less than the bore 405. In such a case, however, the wire loop should be of sufficient size that it is capable of being expanded to a diameter greater than the bore diameter so that upon expansion the resonating laser light may pass through the loop without obstruction.

Preferably bore 405 extends radially through the end wall on which the optical element 116 to be protected is mounted. However, it is also possible to construct a high-voltage duct 301 that would allow the dedusting unit to be inserted through a bore extending transversely through the end wall in which the optical element 116 to be protected is mounted.

After the dedusting unit 115 is installed, the circular wire loop end portion 302 is disposed in front of and in close proximity to the inner facing surface of optical element 116 mounted on end wall 96. The wire loop end portion 302 is electrically coupled with a high-voltage power supply (not shown) via high-voltage conductor 304, which forms the conducting core of waveguide like coaxial duct 301. The high-voltage power supply may be provided inside or outside the laser tube 101.

The dedusting unit 115, as shown in FIG. 5, comprises securing means 402, 403, 404, 408 for connecting the dedusting unit 115 to a high voltage supply (not shown) inside or outside the tube 101. The securing means comprise for example a flange for being fixed to a housing of the high voltage power supply.

When there is high voltage applied to the wire loop 302, an electric field with very high field gradients is generated. As a result of this electric field, the dust particles in the tube 101 are electrostatically charged and thus they are pushed off, so that they cannot easily reach the window 116. The dust particles are pushed off to walls 406 of a small chamber 407 which may be provided in port 97, or, alternatively to inner side walls of the tube.

Thus, in difference to the devices according to the state of the art, by the present invention, the optical element itself is not used for pushing off electrostatically precharged dust particles. Instead, the previously nonelectrostatically charged dust particles are charged by the electric field with the high field gradient generated by the wire loop 302 and the then the charged particles are pushed off.

From the above description it should be understood, that the dedusting unit 115 may naturally be mounted in front of a different optical element such as the rear optical element 116 mounted on the rear end wall 98. Furthermore, the dedusting unit 115 of the present invention may be used to protect a variety of optical elements, including mirrors (fully reflective or partially reflective, partially transmissive mirrors), or any other optical element, for instance a 100% transparent window, if the reflective laser optical elements are disposed outside the tube. The dedusting unit of the present invention may also be employed to protect optical elements that may be fully contained in the laser tube and thus have are exposed to the laser cavity and the dust therein on both sides.

Furthermore, it should be understood that the invention is suitable for any gas laser, though in the preferred embodiment, an excimer laser is described as described above.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention, which is set forth in the following claims.

What is claimed is:

1. A dust repelling unit to be placed in a gas laser unit in front of a laser optical element, comprising:
    a high-voltage duct comprising a high-voltage conducting core having a first end and a second end and an insulator element disposed around the core, the first end of the core being connectable to a high voltage power supply; and
    a closed wire loop electrically connected to the second end of the high-voltage core; and
    wherein when connected to a high voltage power supply, the closed wire loop creates an electric field for charging and repelling dust particles.

2. A dust repelling unit of claim 1, wherein the high-voltage duct comprises a coaxial duct.

3. A dust repelling unit of claim 2, wherein the insulator element of the high-voltage duct comprises a cylindrical ceramic tube and the core is coaxial disposed within the ceramic tube.

4. A gas laser, comprising:
    a tube having a first end wall at one end and second end wall at the other end and defining a cavity for containing a laser gas;
    an elongated high voltage electrode within the tube and extending parallel to the longitudinal axis of the tube;
    an elongated ground electrode within the tube, the ground electrode extending parallel to the high voltage electrode and being spaced apart from the high voltage electrode to therby define a gas discharge gap therebetween;
    a laser resonating path in axial alignment with the gas discharge gap;
    a first laser optical element disposed in the laser resonating path and having a first side exposed to the cavity formed by the tube; and
    a dust repelling unit comprising (1) a high-voltage duct copmrising a high-voltage conducting core having a first end and a second end and an insulator element disposed around the core, the first end of the core being connectable to a high voltage power supply, and (2) a closed wire loop electrically connected to the second end of the high-voltage core; wherein
    the dust repelling unit is mounted to the laser tube so that the wire loop is disposed inside the tube in proximity to the first side of the optical element, and the wire loop is transverse to the resonating path so that the resonating path passes through the wire loop.

5. A gas laser according to claim 4, wherein the optical element comprises an optical element selected from the group consisting of a fully reflective mirror, a partially transparent, partially reflective mirror, and a fully transparent window.

6. A gas laser according to claim 4, wherein the optical element is mounted on the first end wall and comprises an optical element selected from the group consisting of a fully reflective mirror, a partially transparent, partially reflective mirror, and a fully transparent window.

7. A gas laser according to claim 6, further comprising:
    a second optical elements disposed in the laser resonating path and mounted on the second end wall of the laser tube, wherein the second optical element includes a first side exposed to the cavity formed by the tube, and the second optical elements is selected from the group consisting of a fully reflective mirror, a partially transparent, partially reflective mirror, and a fully transparent window; and
    a second dust repelling unit mounted to the laser tube so that the wire loop is disposed inside the tube in proximity to the first side of the second optical element, and the wire loop is transverse to the resonating path so that the resonating path passes through the wire loop.

8. A gas laser according to claim 4, wherein the high-voltage duct comprises a coaxial duct.

9. A gas laser according to claim 5, wherein the insulator element of the high-voltage duct comprises a cylindrical ceramic tube and a core is coaxial disposed within the ceramic tube.

10. A gas laser according to claim 4, wherein the high voltage duct of the dust repelling unit extends through the first end wall.

11. A gas laser according to claim 6, wherein the high voltage duct of the dust repelling unit extends through the first end wall.

12. A gas according to claim 4, wherein the laser gas is an excimer laser gas.

13. A method for installing a dust repelling unit for a laser optical element of a gas laser comprising a tube having a first end wall at one end and a second end wall at the other end and defining a cavity for containing a laser gas, a laser resonating path substantially parallel to the longitudinal axis of the tube and along which coherent light can resonate, and a laser optical element having a first side exposed to the cavity formed by the tube, the laser optical element being mounted to the first end wall so that the first side of the optical element is disposed in the laser resonating path, and wherein the dust repelling unit for the optical element comprises (1) a high-voltage duct comprising a high-voltage conducting core having a first end and a second end and an insulator element disposed around the core, the first end of the core being connectable to the high voltage power supply, and (2) a closed wire loop electrically connected to the second end of the high-voltage core, the method comprising the steps of:
    flattening the wire loop into an elongated shape so that the width of the wire loop is smaller that the diameter of a bore hole extending through the first end wall,
    inserting the wire loop through the bore hole until the elongated wire loop is inside the tube;
    expanding the elongated wire loop to a desired form which is transverse to the resonating path; and positioning the wire loop of desired form so that it is in proximity to the first side of the optical element and the laser resonating path passes through the wire loop.

14. A method according to claim 13, wherein the desired form is a circular form.

15. A method according to claim 13, wherein the laser gas is an excimer laser gas.

16. A method according to claim 13, wherein the bore extends radially through the first end wall.

17. A method according to claim 13, wherein the optical element comprises an optical element selected from the group consisting of a fully reflective mirror, a partially transparent, partially reflective mirror, and a fully transparent window.

18. A method for installing a dust repelling unit for a laser optical element of a gas laser comprising a tube having a first end wall at one end and a second end wall at the other end and defining a cavity for containing a laser gas, a laser resonating path substantially parallel to the longitudinal axis of the tube and along which coherent light can resonate, and a laser optical element disposed in the laser resonating path and having a first side exposed to the cavity formed by the tube, wherein the first end wall has a port aligned with the resonating path and a bore hole for installing the dust repelling unit therethrough, and the optical element is mounted to the first end wall in alignment with the port, and wherein the dust repelling unit for the optical element comprises (1) a high-voltage duct comprising a high-voltage conducting core having a first end and a second end and an insulator element disposed around the core having an outer diameter which is less than the diameter of the bore hole, the first end of the core being connectable to the high voltage power supply, and (2) a closed wire loop electrically connected to the second end of the high-voltage core and having a diameter greater than the diameter of the bore, the method comprising the steps of:

flattening the wire loop into an elongated shape so that the width of the wire loop is smaller that the diameter of the bore;

inserting the dust repelling unit, wire loop end first, through the bore until the elongated wire loop is inside the tube and at least a portion of the high-voltage duct is within the bore;

expanding the elongated wire loop to a desired form which is transverse to the resonating path; and positioning the wire loop of desired form so that it is in proximity to the first side of the optical element and the laser resonating path passes through the wire loop.

19. A method for installing a dust repelling unit for a laser optical element of a gas laser comprising a tube having a first end wall at one end and a second end wall and a bore hole extending through the first end wall, wherein the dust repelling unit for the optical element comprises (1) a high-voltage duct comprising a high-voltage conducting core having a first end and a second end and an insulator element disposed around the core having a diameter which is less than the bore hole in the first end wall of the tube, the first end of the core being connectable to the high voltage power supply, and (2) a flattened closed wire loop electrically connected to the second end of the high-voltage core having a diameter smaller than the bore diameter, but which is capable of being expanded to a diameter greater than the bore diameter, the method comprising the steps of:

inserting the wire loop through the bore until the elongated wire loop is inside the tube;

expanding the elongated wire loop to a desired form which has a diameter greater than the bore diameter and which is transverse to a laser resonating path that is substantially parallel to the longitudinal axis of the tube; and positioning the wire loop of desired form so that it is in proximity to an optical element disposed in the laser resonating path and so that the laser resonating path passes through the wire loop.

20. The dust repelling unit of claim 1 wherein the wire loop is circular in form.

* * * * *